(12) United States Patent
Wang et al.

(10) Patent No.: US 11,635,090 B2
(45) Date of Patent: Apr. 25, 2023

(54) HOUSEHOLD SUBMERSIBLE PUMP

(71) Applicant: Forcome (Qingdao) Co., Ltd, Qingdao (CN)

(72) Inventors: Yandi Wang, Jiaonan (CN); Gang Wang, Shanghai (CN); Hanjie Zhou, Qingdao (CN)

(73) Assignee: FORCOME (QINGDAO) CO., LTD, Qingdao (CN)

(*) Notice: Subject to any disclaimer, the term of this patent is extended or adjusted under 35 U.S.C. 154(b) by 37 days.

(21) Appl. No.: 17/542,616

(22) Filed: Dec. 6, 2021

(65) Prior Publication Data
US 2022/0299043 A1    Sep. 22, 2022

(30) Foreign Application Priority Data

Mar. 19, 2021    (CN) .......................... 202120563525.1

(51) Int. Cl.
    *F04D 29/40*      (2006.01)
    *F04D 29/70*      (2006.01)
    (Continued)

(52) U.S. Cl.
    CPC ....... *F04D 29/406* (2013.01); *F04D 15/0218* (2013.01); *F04D 29/708* (2013.01);
    (Continued)

(58) Field of Classification Search
    CPC ........ F04D 13/06; F04D 13/08; F04D 13/086; F04D 15/0218; F04D 29/70; F04D 29/701; F04D 29/708; F04D 29/4293
See application file for complete search history.

(56) References Cited

U.S. PATENT DOCUMENTS

| | | | |
|---|---|---|---|
| 7,371,045 B2 * | 5/2008 | Patel ..................... | F04D 13/086 |
| | | | 415/206 |
| 11,035,367 B1 * | 6/2021 | Hansen ................. | F04B 23/021 |
| | | (Continued) | |

FOREIGN PATENT DOCUMENTS

| | | | | |
|---|---|---|---|---|
| CA | 2795964 A1 | * | 5/2013 | ............. F04B 17/03 |
| GB | 2577818 A | * | 4/2020 | ............. F04B 39/16 |
| WO | WO-2022110122 A1 | * | 6/2022 | ............. F04D 13/08 |

*Primary Examiner* — Sabbir Hasan
*Assistant Examiner* — Jackson N Gillenwaters
(74) *Attorney, Agent, or Firm* — Lex IP Meister, PLLC

(57) ABSTRACT

The utility model relates to a household submersible pump, which comprises a pump base, a pump body and a signal light assembly, wherein the pump base is provided with a water outlet, a water inlet and a first filter screen; the pump body has an inner housing having an inner electrical chamber equipped with a circuit board therein and a front mount, and an outer housing having a front guiding seat; the signal light assembly comprises a signal light connected to the circuit board and a light guiding column with a waterproof seal ring embedded therein; the light guiding column is able to be rotated from a first state in which it can be inserted into the front mount through the front guiding seat to a second state in which it is locked in the front mount, and is set to be able to export the light emitted from the signal light to the outside of the outer housing. The utility model not only achieves an outward propagation of light to indicate the status of the pump but also achieves an IPX8 level waterproof.

20 Claims, 7 Drawing Sheets

(51) Int. Cl.
*F04D 15/02* (2006.01)
*F04D 13/08* (2006.01)
*G01F 23/00* (2022.01)
*F16L 37/098* (2006.01)

(52) U.S. Cl.
CPC ........ *F16L 37/098* (2013.01); *G01F 23/0007* (2013.01); *F04D 13/086* (2013.01)

(56) References Cited

U.S. PATENT DOCUMENTS

| | | | | |
|---|---|---|---|---|
| 11,592,033 | * | 2/2023 | Garcia | F04D 13/086 |
| 2016/0298637 A1 | * | 10/2016 | Rejniak | F04D 15/0218 |
| 2022/0154720 A1 | * | 5/2022 | Bovill | F04D 15/0218 |

* cited by examiner

HOUSEHOLD SUBMERSIBLE PUMP

FIELD OF THE INVENTION

The utility model relates to the technical field of submersible pumps, in particular to a household submersible pump.

BACKGROUND OF THE INVENTION

Domestic submersible pumps are increasingly used in a wide range of applications, such as in swimming pools, wastewater ponds, etc. However, the current domestic submersible pumps are not satisfactory in many aspects such as:

1) Transmitting the pump failure or work information through the light belongs to a blank area, that is, information transmission through the light signal has not been done before. In such circumstances, the user has no way to directly know the real working state of the pump, and correspondingly cannot timely make the right response for the case of pump failure, if the environment is dark, or the pump is underwater, 2) There is only a single layer of filtration function at the inlet of the pump base. With the single filtration function, filtration function is only obvious for particulate rather than fibers, which inevitably results in pump clogging or burning out. Moreover, as the existing filter screen is non-removable, or not easily removed, a professional staff is often needed to disassemble and clean the pump, which significantly increases maintenance costs and affect the quality and service life of the pump;

3) The outlet on the pump base is connected to a syphon or joint by threads. This structure puts higher demands on operation for common users because the threads are easy to be damaged, the installation efficiency is low, the installation is not secure and easy to cause leakage. When the bend joint is to be connected with the pump after it has already been connected to a pipeline, the operation becomes more difficult, and the threads are more easy to become loose during installation or use and then cause leakage 4) In terms of controlling the pump to automatically start or stop by sensing the height of the water level, the existing household submersible pump is only concerned with the setting of the pump in the normal upright state, and its control system will fail when the pump is in other toppled or overturned states.

For example, when the pump is in the overturned state, and its water level is higher than its normal priming level and lower than the height of the overturned impeller, the pump will work but cannot drain; the existing probe sensor switch senses the water level and provides a wrong judgment, the pump will continue to operate in such a water level state, but such operation is ineffective (namely no drainage), which will eventually lead to shortened pump life or direct scrap.

For pumps with conventional float switches, the applied conventional float switch will fail when the pump is overturned, and the pump will not operate even when the water level is higher than the height of the position of the impeller that overturned with the pump.

SUMMARY OF THE UTILITY MODEL

To overcome the above defects, firstly, it would be advantageous to provide a household submersible pump that can display the working/fault status by signal light; secondly, it would be more advantageous to provide a household submersible pump with secondary filtration function that can filter not only particulate matter but also fiber material on the basis of above; thirdly, it would be more advantageous to provide a household submersible pump that can facilitate quick insertion and removal of water pipes on the basis of the utility model on the basis of above. Finally, it would be most advantageous to provide a household submersible pump that can sense the water level in all directions and avoid the pump from working ineffectively when the pump is toppled or overturned.

To achieve the above purpose, the utility model provides a household submersible pump, which comprises:

a pump base having a water outlet at the rear side thereof and a water inlet at the bottom thereof, wherein a first filter screen is provided inside the pump base directly opposite the water inlet;

a pump body comprising an inner housing and an outer housing, wherein the inner housing is provided with an inner electrical cavity having a circuit board therein and a front mount, the outer housing is provided, in correspondence with the position of the front mount, with a front guiding seat;

a signal light assembly comprising a signal light and a light guiding column with a watertight seal embedded therein, wherein the signal light is electrically connected to the circuit board, the light guiding column is rotatable from a first state in which it is inserted into the front mount through the front guiding seat to a second state in which it is locked within the front mount, and is capable of guiding light from the signal light to the outside of the outer housing.

In this utility model, the signal light and the circuit board are installed together within the electrical cavity, and the light guiding column and the electrical cavity can be waterproofed to IPX8 level through the waterproof seal ring; the light guiding column can be inserted and locked in the front mount of the inner housing; the light of the signal light can be transmitted to the outside through the light guiding column so that the signal light can be observed from the outside of the pump so as to help people to identify the working/fault status of the pump.

Further, the light guiding column is locked in the front mount in the second state by means of a self-locking mechanism comprising a first locking member and a second locking member, wherein the first locking member is a locking male piece or a locking female piece formed on the light guiding column, and the second locking member is a locking female piece or a locking male piece formed on the front mount.

Through the above construction, the light guiding column can be locked onto the front mount in the second state by means of the self-locking mechanism. In this way, the light guiding column can be effectively positioned.

Further, the front mount includes a mounting slot with its upper side opening and a locking wing located above the mounting slot, the first locking member is a locking block formed on the light guiding column, and the second locking member is a side opening locking notch formed on the locking wing and adapted for the locking block, wherein, in the first state, the locking block is located outside of the side opening locking notch and the light guiding column can move back and forth along the mounting slot, and in the second state, the locking block is engaged with or held by the side opening locking notch so that the light guiding column is locked in the front mount.

By the above construction, the light guiding column can be mounted onto the front mount in the first state and is able to be moved from the first state to the second state by being turned, and in the second state, the light guiding column is fixed in the front mount by the self-locking mechanism.

Still further, the mounting slot has an inner port, and the signal light is arranged directly opposite to the inner port. Preferably, the signal light is an LED light.

Through this construction, the light emitted from the LED lamp can come out through the inner port and enter into the light guiding column.

Still further again, the mounting slot is a step-shaped slot which includes a small-diameter hole, a medium-diameter hole and a large-diameter hole, and the light guiding column includes a small-diameter section, a medium-diameter section and a large-diameter section correspondingly, wherein the small-diameter section is provided in size corresponding to the small-diameter hole and the inner port, the medium-diameter section is provided in size corresponding to the medium-diameter hole and is provided with a circumferential groove for receiving a waterproof seal ring, the large-diameter section is provided in size corresponding to the large-diameter hole, and the front guiding seat is provided to adapt to receive the large-diameter section.

With the above construction, three waterproof seals are formed between the light guiding column and the mounting slot. The first layer of waterproof lies between the large-diameter section and the medium-diameter hole, the second layer of waterproof lies between the waterproof seal ring and the medium-diameter hole, and the third layer of waterproof lies between the medium-diameter section and the small-diameter hole, which makes the waterproof effect stronger.

Furthermore, the above pump body also comprises a front panel attached to the outer front side of the outer housing, wherein the front panel is provided with an eye opening corresponding to the front guiding seat, the light guiding column comprises a front grip, the front grip includes an outer eye portion and an inner stop portion having a larger size than that of the outer eye portion, the inner stop portion is located between the front panel and the front guiding seat, and the outer eye portion is received in the eye opening.

In the above construction, the front grip is provided for the user to easily hold the light guiding column so that the light guiding column can be easily rotated manually for installation and positioning. In addition, by means of the inner stop portion on the front grip, the light guiding column can be further positioned through the outer housing and the front panel.

Still further, the front guiding seat has a guiding channel for receiving the light guiding column, and the eye opening is arranged directly opposite to the guiding channel.

By the above construction, the light guiding column mounted in the guiding channel and the mounting slot is able to receive light from the signal light and displays it at the position of the eye opening.

Further again, the circuit board is designed to be able to control the color change of the signal light so as to give a working signal or a fault signal through the light guiding column.

Through the above arrangement, the user can determine whether the household submersible pump is in a working state or in a fault state with the help of the color of the signal light displayed by the light guiding column.

Further, a second filter screen is provided at the water inlet, which is removably mounted on the bottom of the water inlet on the outside of the first filter screen, wherein both the first filter screen and the second filter screen have filter holes, and the aperture diameter of the filter holes on the second filter screen is smaller than that of the filter holes on the first filter screen.

By the above arrangement, it can effectively isolate long or fibrous materials from entering the pump without affecting the pump performance.

Still further, the aperture diameter of the filter holes on the second filter screen is 2 to 4 mm.

Still further again, the pump base is provided with an engaging recess at the bottom thereof, and the second filter screen is provided with an engaging protrusion at its circumferential edge to adapt for the engaging recess.

Through the above construction, the second filter screen can be connected to the engaging recess at the bottom of the pump body by means of the engaging protrusion rather than any screwing bolt. In this way, the second filter screen can be removed from the pump body and washed at any time when necessary, and the whole operation is simple and convenient.

Further again, the second filter screen is also provided with a toggle rib to facilitate the detachment and installation of the second filter screen.

In the removal or installation of the second filter screen, the user can use his fingers to prod or push the toggle rib so as to easily detach or install the second filter screen.

Still further again, the pump base is provided with at least two engaging recesses at the bottom thereof which are evenly distributed along the circumference of the bottom, and correspondingly, the number of engaging protrusions on the second filter screen is the same as that of the engaging recesses.

Furthermore, on the second filter screen, the toggle ribs are provided in corresponding position and number as the engaging protrusions.

Further, the water outlet is connected with a quick coupling device for pluggable installation or removal of a water pipe, the quick coupling device comprises a locking ring, a resetting spring and a movable ring which are sequentially sleeved on the water outlet, and further comprises a joint with a sealing ring or gasket.

Through the above construction, easy operation can be achieved, which can completely solve the user's troubles of installation and use, and the product qualification rate and production efficiency are greatly improved by eliminating thread structure.

Still further, the locking ring is provided with a latch, the joint is provided with an annular guiding groove for matching the latch on the locking ring, and the water outlet of the pump base is provided with an opening on its outer pipe wall for the latch to pass radially through and thereby enter the annular guiding groove.

With the above construction, the joint can be rotated and used in a sealed state.

Still further again, the water outlet of the pump base is provided with an annular stop on the outer wall thereof for limiting the axial travel of the resetting spring, the movable ring is provided with a flexible clasp at the inner surface thereof, and the resetting spring is positioned between the annular stop and the flexible clasp so that when the movable ring is moved axially along the outer wall of the water outlet, the resetting spring can move between a locked position and an unlocked position with the distance adjustment between the annular stop and the flexible clasp, wherein in the locked position, the resetting spring is in an extended reset state in which the latch on the locking ring engages the annular guiding groove on the joint; in the unlocked position, the resetting spring is in a compression state in which the latch on the locking ring is disengaged from the annular guiding groove on the joint under the action of external force so that the joint can be pulled out from the water outlet.

Still further, the joint is an elbow joint or union elbow, or a straight joint.

Further, the above household submersible pump also comprises a water level detection device for detecting all kinds of attitudes of the pump which is installed at the bottom of the pump base and electrically connected to the circuit board, wherein the water level detection device includes a first probe, a second probe, a third probe, wherein the first probe and the second probe is located on one side of the water outlet, the third probe is located on the other side of the water outlet, the length of the second probe is shorter than that of the first probe, the first probe and the third probe have the same length.

Through the above arrangements, the operation of the pump can be protected completely even under abnormal condition by means of three probes and special spatial layout thereof. The water level detection device is able to contribute to such a response mode that the pump can respond whatever the attitude of the pump is. That is to say, the existing problem that the control system can only work when the pump is in a normal upright state and would fail when the pump is in a toppled or overturned state is solved without bring a significant increase in cost. Moreover, the pump failure risk is greatly reduced and the pump life is greatly extended.

Further, the water level detection device also includes a bracket which is provided at its two ends a main probe mount for mounting the first probe and the second probe thereon and a secondary probe mount for mounting the third probe thereon.

Further, the bracket is a plastic bracket.

Further again, the water level detection device also includes a signal line which is electrically connected to the circuit board at one end thereof, and to the first probe, the second probe and the third probe respectively at the other end thereof.

The above and other aspects of the utility model will be more clearly described by reference to the embodiments described below.

BRIEF DESCRIPTION OF DRAWINGS

The structure and further objects and advantages of the utility model will be better understood by the following description in conjunction with the accompanying drawings, wherein the same reference marks identify the same or similar components.

DETAILED DESCRIPTION OF EMBODIMENTS

Figure 1:
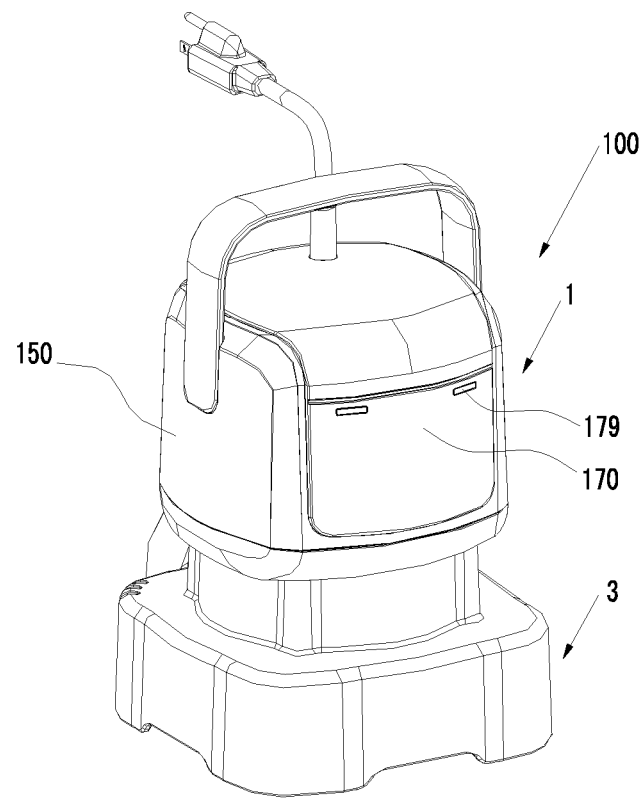
FIG. 1 is a schematic perspective view of a household submersible pump according to a specific embodiment of the utility model showing the external structure.

The utility model will be described below in further details with reference to a particular embodiment thereof in conjunction with the accompanying drawings.

As shown in FIGS. 1 to 7, a household submersible pump 100 according to a specific embodiment of the present utility model includes a pump body 1 and a pump base 3. The pump body 1 includes a signal light assembly 110, an inner housing 130 having an inner electrical cavity 131 accommodating a circuit board 132 therein and a front mount 133, an outer housing 150 having a front guiding seat 153 aligned in position with the front mount 133, and a front panel 170. The pump base 3 is provided with a water outlet 30 located at the rear side thereof and a water inlet 32 located at the bottom thereof. A first filter screen 34 is provided within the pump base 3 and positioned directly opposite to the water inlet 32.

In this embodiment, the signal light assembly 110 includes a light guiding column 113 with a watertight seal 111 embedded therein, and an LED light 115 electrically connected to the circuit board 132. The front mount 133 is integrally formed on the inner housing 130. The light guiding column 113 is arranged in such a way that it can be rotated from a first state in which it can be inserted into the front mount 133 through the front guiding seat 153 (see the left one of the light guiding columns 113 in FIG. 3) to a second state in which it is fixed in the front mount 133 by means of a self-locking mechanism (see the right one of the light guiding columns 113 in FIG. 3). Through such arrangement, the light emitted by the LED lamp 115 is led out of the outer housing 150 through the light guiding column 113.

Figure 2:
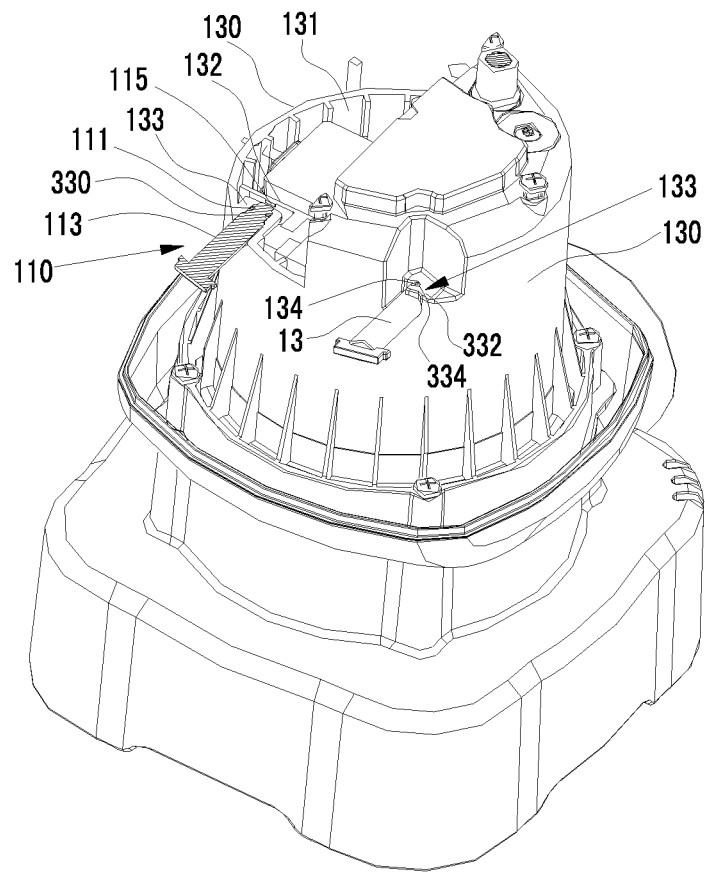
FIG. 2 is a schematic view of the internal structure of the household submersible pump shown in FIG. 1 with the outer housing and the front panel being removed and a partial cross-section being made.

FIG. 2 clearly shows the internal structure of the inner electrical cavity 131 and the structure of the signal light assembly 110. As shown in FIG. 2, the front mount 133 is provided with a mounting slot 330 with an upper side opening and a locking wing 332 located above the mounting slot 330; the self-locking mechanism includes a locking block 134 formed on the light guiding column 113 and a side opening locking notch 334 formed on the locking wing 332 and adapted for the locking block 134, wherein the locking block 134 is formed in this embodiment as a column-shaped pin. It should be understood that in the self-locking mechanism of this embodiment, the locking block 134 is adapted for the side opening locking notch 334 as a locking male piece, but in other embodiments, it is possible to form a locking female piece on the light guiding column 113 and a locking male piece on the locking wing 332 to achieve a matching engagement.

Figure 3:
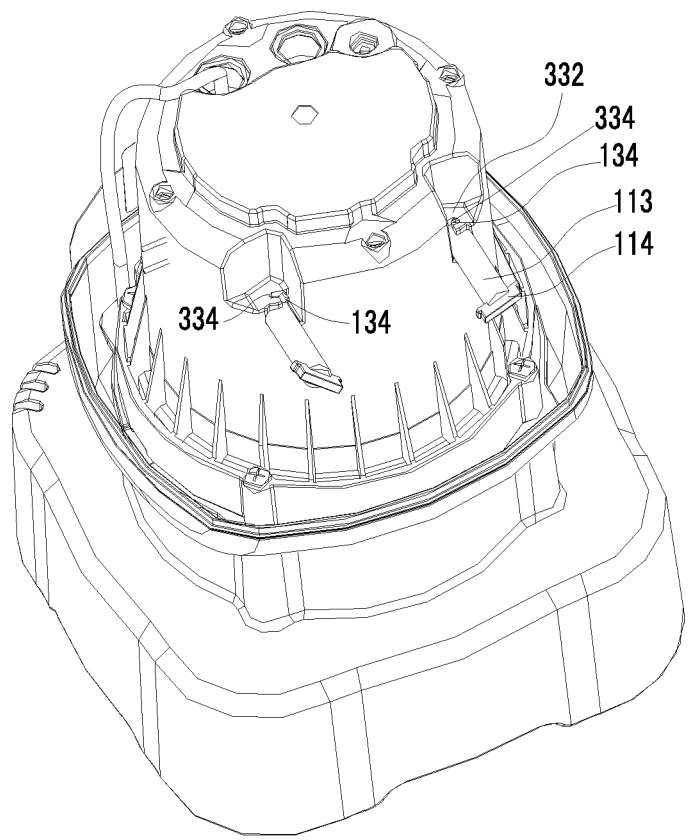
FIG. 3 is a schematic perspective view of the household submersible pump shown in FIG. 1 with the outer housing and the front panel being removed and with one of the light guiding columns being in an unlocked state and the other being in a self-locking state.

As shown in FIG. 3, the left one of the light guiding columns 113 is in the first state, i.e., the installed state or the unlocked state, while the right one of the light guiding columns 113 is in the second state, i.e., the self-locking state. In this embodiment, the light guiding column 113 is arranged to be able to rotate between the first state in which the locking block 134 is located outside of and not engaged with the side opening locking notch 334 so that the light guiding column 113 is able to be moved back and forth along the mounting slot 330, and the second state in which the locking block 134 is engaged in the side opening locking notch 334 so that the light guiding column 113 is fixed in the front mount 133.

Figure 4:
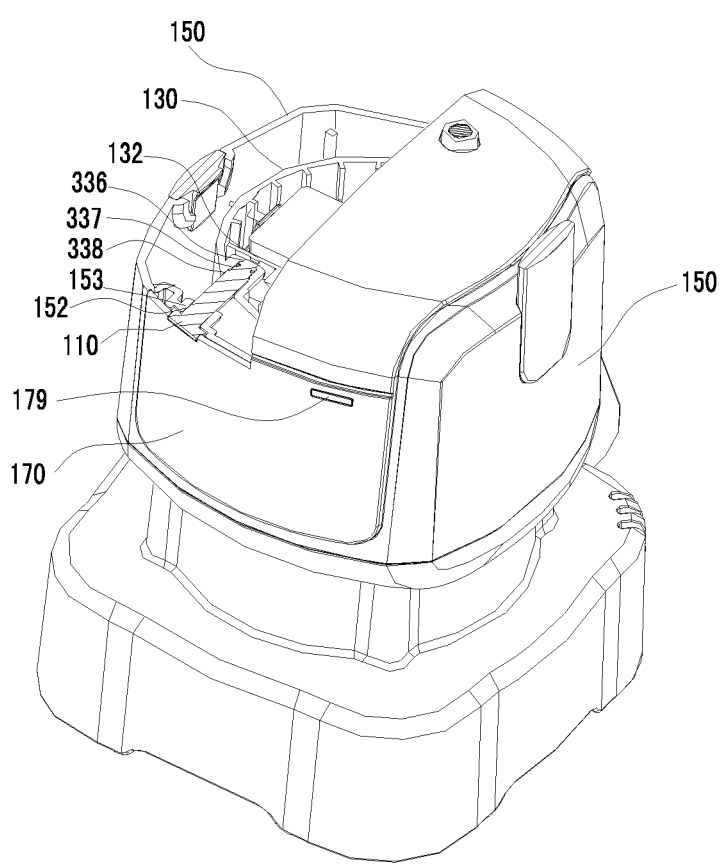
FIG. 4 is a schematic view of the internal structure of the household submersible pump shown in FIG. 1 with partial dissection.
Figure 5:
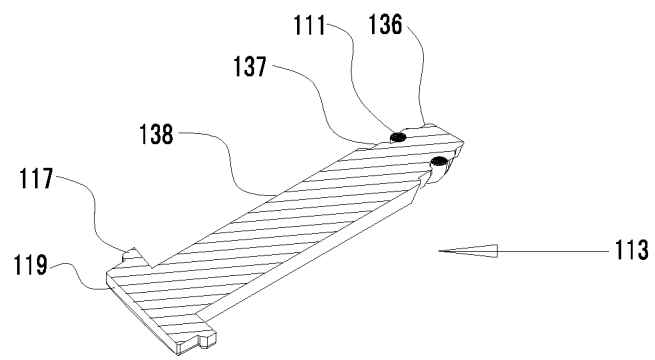
FIG. 5 is an enlarged view of the left one of the light guiding columns in FIG. 2, which also shows a waterproof seal ring.

Referring to FIG. 4 and in conjunction with FIG. 2, the mounting slot 330 has an inner port (not shown in FIGS.) to which the LED light 115 is opposite. The mounting slot 330 is formed as a step-shaped passage, which comprises a small-diameter hole 336, a medium-diameter hole 337 and a large-diameter hole 338. As shown in FIG. 5, the light guiding column 113 correspondingly comprises a small-diameter section 136 sized in correspondence with the small-diameter hole 336 and the inner port, a medium-diameter section 137 sized in correspondence with the medium-diameter hole 337 and a large-diameter section 138 sized in correspondence with the large-diameter hole 338, wherein the medium-diameter section 137 is provided with a circumferential groove (not shown) for receiving the watertight seal 111, and the large-diameter section 138 is configured to be suitable for being received in the front guiding 153.

As shown in FIGS. 4 and 5, the front panel 170 is located on the outer front side of the outer housing 150 and is attached to the outer housing 150. The front panel 170 is provided with an eye opening 179 corresponding to the front guiding seat 153. The light guiding column 113 has a front grip 114 which includes an inner stop portion 117 and an outer eye portion 119, wherein the inner stop portion 117 is located between the front panel 170 and the front guiding seat 153 and is larger in size than the outer eye portion 119 which is accommodated within the eye opening 179. The front guiding seat 153 has a guiding channel 152 for receiving the light guiding column 113, and the eye opening 179 is arranged directly opposite to the guiding channel 152.

As shown in FIGS. 2 to 5, during assembly, the front grip 114 of the light guiding column 113 can be grasped, the light guiding column 113 can be inserted in the first state as shown in FIG. 3 into the guiding channel 152 of the front guiding seat 153 of the outer housing 150 from the front end of the guiding channel 152, and pushed backward into the front mount 133 of the inner housing 130. When the light guiding column 113 is continued to be pushed backward along the mounting slot 330 of the front mount 133, the medium-diameter section 137 of the light guiding column 113 would abuts the shoulder (not shown) of the mounting slot 330 which is located between the small-diameter hole 336 and the medium-diameter hole 337. At this point, the locking block 134 on the light guiding column 113 is just opposite to the opening of the side opening locking notch 334 of the locking wing 332. Next, the light guiding column 113 is rotated so that the locking block 134 thereon enters the side opening locking notch 334 and is engaged with the opening locking notch 334 in a snap-fit way, thereby the light guiding column 113 is secured relative to the front mount 133 of the inner housing 130 and entered into the second state. Subsequently, the front panel 170 is attached to the outer housing 150, for example, in a way of snap-fit, so that the inner stop portion 117 of the front grip 114 of the light guiding column 113 is limited between the front panel 170 and the front guiding seat 153, and the outer eye portion 119 of the light guiding column 113 is just accommodated in the eye opening 179. In this way, the light of the LED lamp 115 can be transmitted outwards through the light guiding column 113 and pass through the eye opening 179 on the front panel 170 so that the light emitted from the LED lamp 115 can be observed by the user.

It is noted that in this implementation, the circuit board 132 is designed to control the color change of the LED light 115 so as to give a working or fault signal of the household submersible pump through the light guiding column 113. That is to say, the circuit board 132 is designed to control the color change of the LED light 115 to show or indicate the state of pump by means of the light guiding column 113. For example, when the LED light 115 emits green light and the light guiding column 113 looks in green color, it shows that the pump is in normal operation, but when the LED light 115 emits red light and the light guiding column 113 looks in red, it means that the pump is in a fault state and needs to be maintained.

In this embodiment of the utility model, since the LED lamp 115 and the circuit board 132 are integrated in the electrical cavity 131 and the waterproof seal ring 111 is applied, an IPX8 level waterproof can be achieved between the light guiding column 113 and the electrical cavity 131; as the LED lamp 115 is arranged in the watertight electrical cavity 131, and the light is transmitted to the outside through the light guiding column 113, the problem of waterproof and light display can effectively solved at the same time; as all portions of the light guiding column 113, namely inner stop portion 117 of the front grip 114, large-diameter section 138, medium-diameter section 137 and small-diameter section 136, have different sizes, three waterproof seals (four waterproof seals if the waterproof seal ring 111 is counted in) are formed, making the waterproof effect stronger; the light guiding column 113 can be easily mounted on the front mount 133 of the inner housing 130 by means of a self-locking mechanism (including locking block 134 and side opening locking notch 334); the light guiding column 113 can be further positioned with the help of the outer housing 150 and the front panel 170.

In addition, it should be noted that although LED lights are used as the light source in this implementation, it should be understood that other light sources can also be used.

Figure 6:
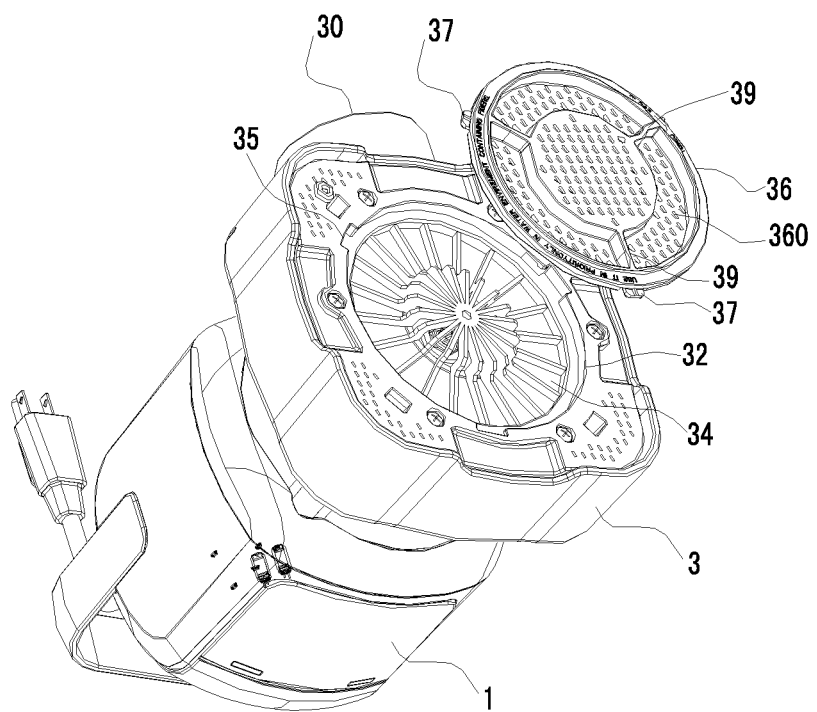
FIG. 6 is an exploded view of the household submersible pump shown in FIG. 1, which illustrates the second filter screen.

In this implementation, as shown in FIG. 6, a second filter screen 36 is provided at and detachable from the water inlet 32. Specifically, the second filter screen 36 is located on the outside of the bottom of the water inlet 32, and the aperture of the filter hole 360 formed on the second filter screen 36 is smaller than that of the filter hole (not shown) on the first filter screen 34. There are three engaging recesses 35 (also called engaging notches) at the bottom of the pump base 3, and three engaging protrusions 37 are correspondingly provided at the edge of the second filter screen along a circumferential direction to match the engaging recesses 35. Moreover, there are three toggle ribs 39 on the second filter screen 36 to facilitate disassembly and installation of the second filter screen 36, and these toggle ribs 39 may be provided in correspondence with the position of the clasps 37.

In this embodiment, the aperture diameter of the filter hole 360 of the second filter screen 36 is 2 mm, and in other practical application, the aperture diameter of the filter hole 360 of the second filter screen 36 can also be set to 3 mm or 4 mm. In addition, in practical application, the numbers of the engaging recess 35, the engaging protrusion 37 and the toggle rib 39 are the same and may also be two or four, or even more.

In this implementation, thin strip or fiber materials can be effectively isolated from entering the pump without affecting the pump performance because a removable second filter screen 36 is arranged at the water inlet 32, the second filter screen 36 is located on the outside of the bottom of the water inlet 32 and the aperture diameter of the filter hole 360 on the second filter screen 36 is smaller than that of the filter hole on the first filter screen 34. Additionally, the second filter screen 36 is connected to the pump through the engaging protrusion 37 being snapped in the engaging recess 35 on the bottom of the pump base 3, which is a screw-free design. With the above construction, the second filter screen 36 can be disassembled and cleaned at any time in a simple and convenient way.

Figure 7:
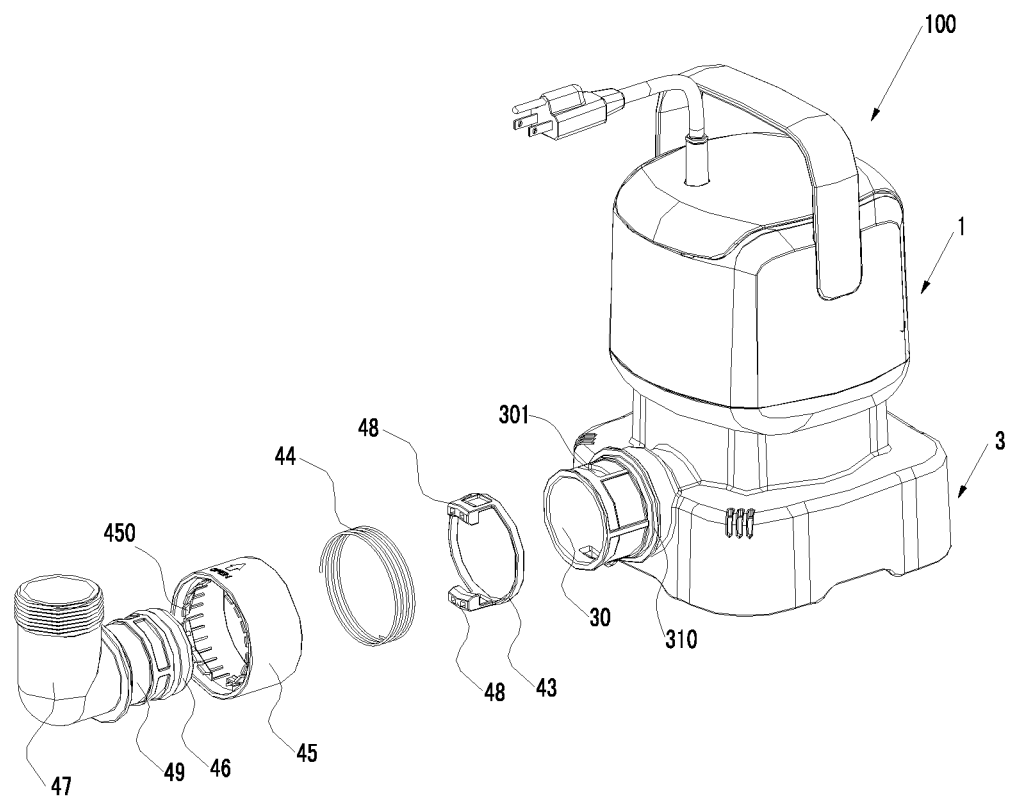
FIG. 7 is a schematic view of the household submersible pump shown in FIG. 1 viewed from a different perspective, which illustrates the exploded quick coupling device.
Figure 8:
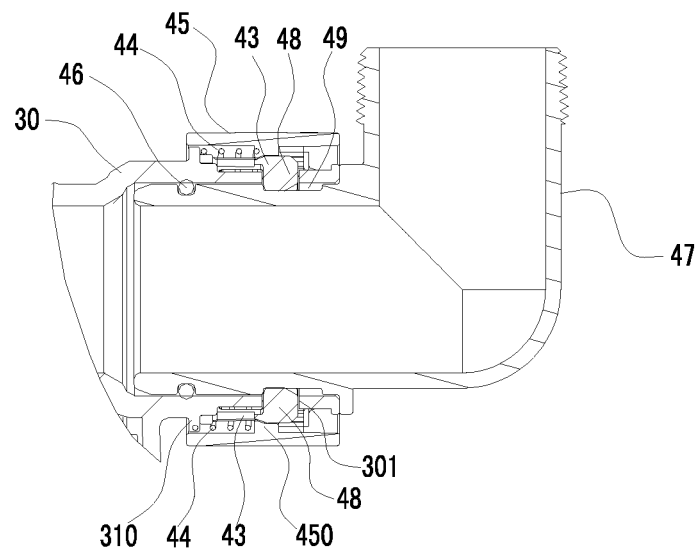
FIG. 8 is a longitudinal sectional view of the part of the quick coupling device of the household submersible pump shown in FIG. 7 after the quick coupling device has been assembled.

In this embodiment, as shown in FIGS. 7 and 8, the household submersible pump 100 also includes a quick coupling device 4 for pluggable installation and removal of the water pipe. The quick coupling device 4 is attached to the water outlet 30 of the pump base 3 and comprises a locking ring 43, a resetting spring 44 and a movable ring 45 which are attached to the outlet 30 in sequence. The quick coupling device 4 further comprises an elbow joint 47 with a sealing ring or gasket 46. The locking ring 43 is provided thereon with a latch 48, and the elbow joint 47 is configured to have an annular guiding groove 49 for mating with the latch 48 on lock ring 43. The water outlet 3 is provided on its outer pipe wall with an opening 301 through which the latch 48 can pass radially and enter into the annular guiding groove 49. The water outlet 30 is also provided on its outer pipe wall with an annular stop 310 for limiting the axial travel of the resetting spring 44, and the movable ring 45 is provided with a flexible clasp 450 at the inner surface thereof, so that the resetting spring 44 can be limited between the annular stop 310 and the flexible clasp 450. In this case, when the movable ring 45 is moved axially along the water outlet 30, the resetting spring 44 alters correspondingly between a locked position and an unlocked position with the distance between the annular stop 310 and the flexible clasp 450 being adjusted. In the locked position, the resetting spring 44 is in an extended reset state and the latch 48 on the locking ring 43 engages with the annular guiding groove 49 on the elbow joint 47; in the unlocked position, the resetting spring 44 is in a compressed state and the latch 48 on the locking ring 43 is disengaged from the annular guiding groove 49 on the elbow joint 47 by external force, thereby enabling the elbow joint 47 to be pulled out of the outlet 30.

It should be noted that although in this implementation, it is the elbow joint 47 that is used as the joint, in practical applications, a straight joint may also be used as the joint.

The working principle of the quick coupling device in this implementation is described below with reference to FIGS. 7 and 8.

The installation process of the elbow joint 47: pushing the movable ring 45 in the direction of the pump base 3 to keep it in the unlocked position, and inserting the end of the elbow joint 47 with seal 46 into the water outlet 30 quickly, then releasing the movable ring 45 so that the movable ring 45 would reset to the locked position under the action of the resetting spring 44 and the latch 48 on the locking ring 43 would be locked in the annular guiding groove 49 on the elbow joint 47.

The disassembly process of the union elbow 47: pushing the movable ring 45 in the direction of the pump base 3 to make the movable ring 45 compress the resetting spring 44, and pulling the elbow joint 47 outwards quickly and directly so that the latch 48 on the locking ring 43 would be released from the annular guiding groove 49 on the elbow joint 47 under the action of external force and the bend joint 47 would be disengaged with the pump base 3, and then releasing the movable ring 45 to make it automatically reset to the locked position under the action of the resetting spring 44.

In this implementation, as a quick connector device 4 is provided at the water outlet 30 of pump base 3 for plugging and unplugging of water pipe to achieve an installation or a removal thereof, the troubles of installation of the water pipe that met by the users can be completely solved by means of one plugging or unplugging action. With the threaded structure being eliminated, the product qualification rate and production efficiency are greatly improved. Additionally, as the bent pipe joint 47 is provided with the annular guiding groove 49 that matches the latch 48 on the locking ring 43, the elbow joint 47 can be rotated for use in a watertight state.

As shown in FIGS. 9 to 14, the household submersible pump in this implementation also includes a water level detection device 5 which is mounted at the bottom of the pump base 3 and electrically connected to the circuit board 132 within the inner electrical cavity 131.

Figure 9:
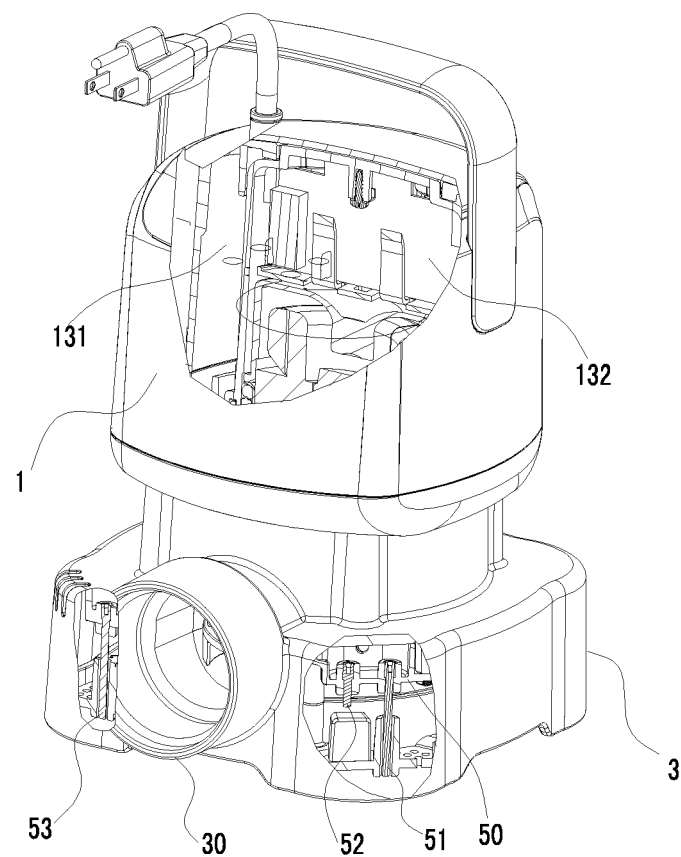
FIG. 9 is a partial sectional view of the household submersible pump shown in FIG. 1
Figure 10:
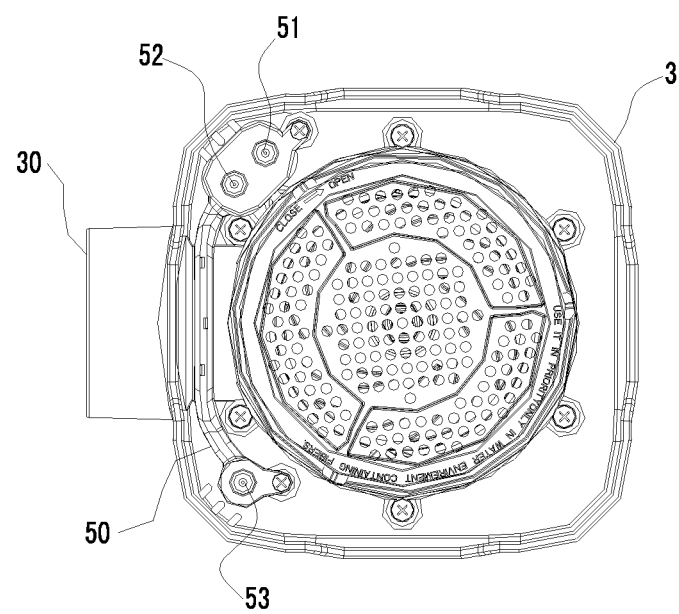
FIG. 10 is a plan view of the household submersible pump shown in FIG. 1 as viewed from the bottom of the pump base, in which the pump is in the first toppled or overturned state and the water outlet is located on the left side of the pump base.
Figure 11:
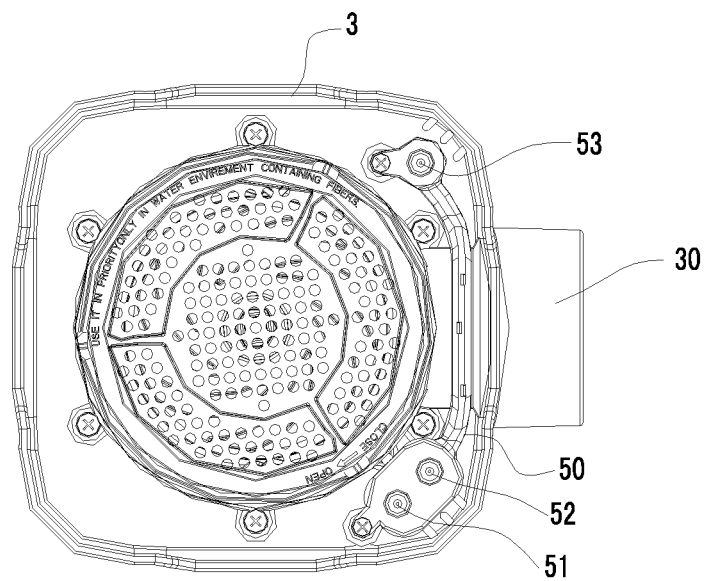
FIG. 11 is a plan view of the household submersible pump shown in FIG. 1 as viewed from the bottom of the pump base, in which the pump is in the second toppled state and the water outlet is located on the right side of the pump base.
Figure 12:
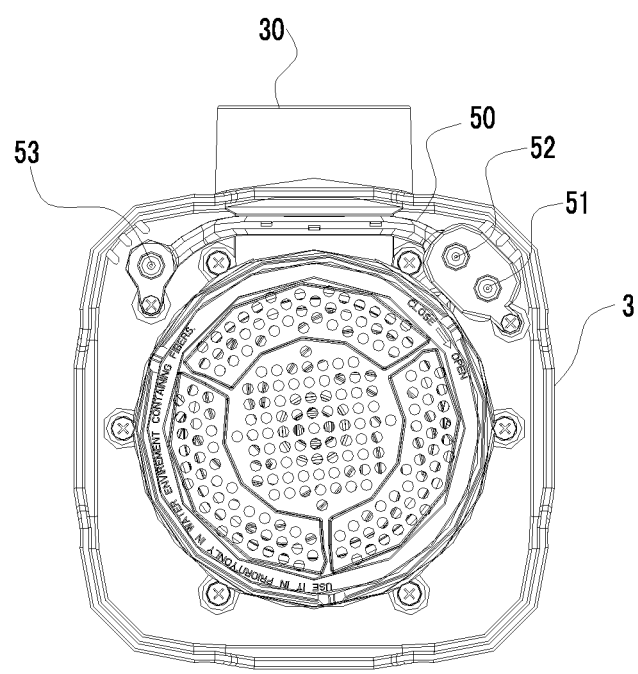
FIG. 12 is a plan view of the household submersible pump shown in FIG. 1 as viewed from the bottom of the pump base, in which the pump is in the third toppled state and the water outlet is located on the upper side of the pump base.
Figure 13:
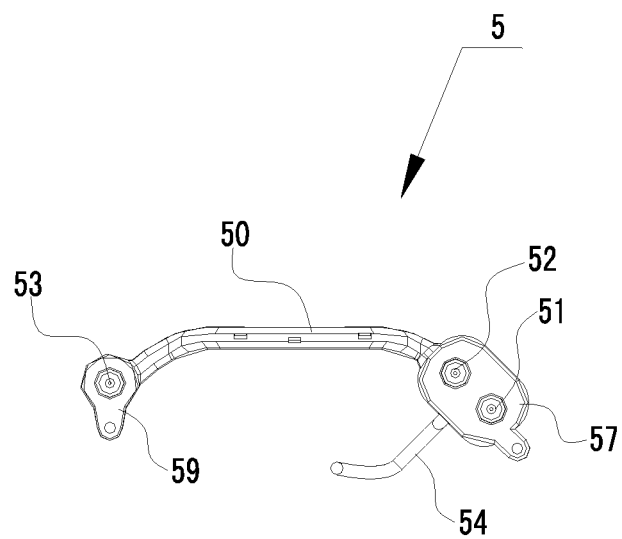
FIG. 13 is an enlarged overall schematic view of the water level detection device of the household submersible pump shown in FIG. 12.
Figure 14:
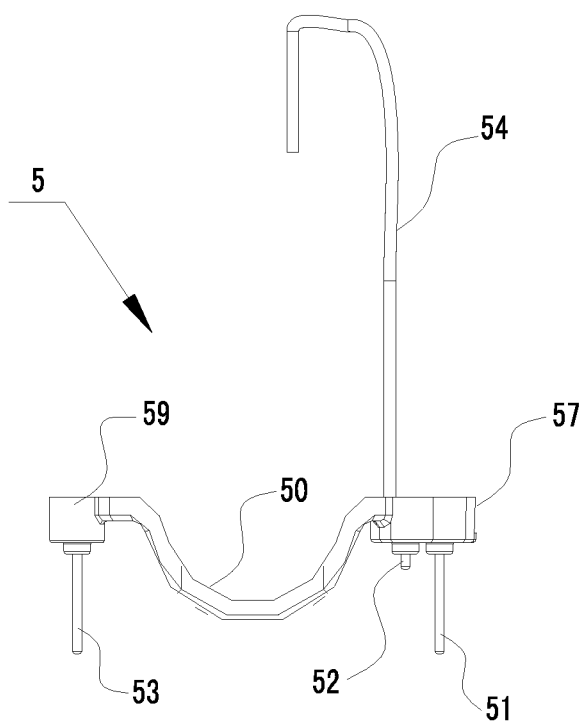
FIG. 14 is a schematic view of the water level detection device shown in FIG. 13 from a different perspective, that is, an enlarged overall schematic view of the water level detection device of the household submersible pump shown in FIG. 9.

As shown in FIGS. 9, 13 and 14, and with reference to FIGS. 10 through 12, the water level detection device 5 comprises a plastic holder 50 provided with a main probe mount 57 and a secondary probe mount 59 at each end thereof, a first probe 51 and a second probe 52 mounted on the main probe mount 57, a third probe 53 mounted on the secondary probe mount 59, and a signal line 54 connected to the circuit board 132 at its one end and the first probe 51, the second probe 52 and the third probe 53 at the other end. That is to say, the first probe 51, the second probe 52 and the third probe 53 are electrically connected to the circuit board 132 via the signal line 54, respectively.

As shown in FIGS. 9 to 12, and with reference to FIGS. 13 and 14, the first probe 51 and the second probe 52 located on the main probe mount 57 are arranged on one side of the water outlet 30 of the pump base 3 (i.e., on the right side in FIG. 12) and the third probe 53 located on the secondary probe mount 59 is arranged on the other side of the water outlet 30 (i.e. on the left side in FIG. 12).

As shown in FIG. 14, the length of the second probe 52 is smaller than that of the first probe 51, and the length of the first probe 51 is the same as that of the third probe 53. It should be understood that in this implementation, the second probe 52 is used as a high water level probe, the first probe 51 and the third probe 53 are used as low water level probes. As two low water level probes are provided and arranged on both sides of the water outlet 30, it is impossible for the pump to work without draining whether the pump is normally upright or in all kinds of tilted state that are shown in FIG. 10 to FIG. 12. The details are as follows:

1) During the household submersible pump in this implementation is in a shutdown state, if the first probe 51 and the second probe 52 are connected in series by water conductivity (according to the prior art, i.e., without the third probe 53, the pump would immediately change its state, namely from a stop state to a start state), the circuit board 132 in this implementation would not give instructions to control the pump to start because the pump is at that moment likely to be in a toppled or overturned state as for example shown in FIG. 11, which can avoid the situation where the pump starts running without discharging water. After all, in the overturned state shown in FIG. 11, the pump would drain water only when the water level exceeds the height of the impeller position of the pump.

if the first probe 51 and the third probe 53 are connected in series by water conductivity, the circuit board 132 in this implementation is also designed to control the pump not to start because both of them are low water level probes which do not control the pump to start.

if the second probe 52 and the third probe 53 are connected in series by water conductivity, the circuit board 132 in this implementation is designed to control pump to start because the pump should be started to start draining whether the pump in this implementation is in a normal upright state or in a overturned state as shown in FIGS. 10 and 12.

2) During the pump in this implementation was in operation, if the electrical connection between the first probe 51 and the second probe 52 is suddenly cut off, that is, is the two probes are no longer connected in series through the water conductivity (according to the existing technology without the third probe 53, the pump will immediately change from the operating state to stop), the circuit board 132 in this implementation may control the pump not to stop because the pump need to continue draining water if the pump at this time is still in normal upright state rather than a overturned state until the water level cannot be detected by the first probe 51 as a low water level probe.

If the first probe 51 and the third probe 53 suddenly disconnected, the circuit board 132 in this implementation will control the pump to stop because when the pump is in a normal upright state, the pump will idle if it continues working.

if the electrical connection between the second probe 52 and the third probe 53 is suddenly cut off, that is, if the two are no longer connected in series through the water conductivity, the circuit board 132 in this implementation will control the pump not to stop and continue running because the pump in this implementation can continue working for draining water whether the pump is in the normal upright state or in the overturned state as shown in FIG. 10 to FIG. 12.

In this implementation, by means of the third probe 53 and its position arrangement relative to the first probe 51, the circuit board 132 can obtain reliable reference information for the pump to switch to the stop state or the running state so as to ensure that the pump can maintain in a correct working state whether the pump is in the normal upright state or overturned state. The correct working state means that if the pump should maintain the current state, it would continue stopping or running, and if the pump should change the current state, it would immediately switch from stopping state to running state or from running state to stopping state.

The technical contents and features of the utility model have been disclosed as above, however, it is understood that under the creative idea of the utility model, a person skilled in the art may make various variations and improvements to the above structure, including combinations of the technical features disclosed herein individually or claimed to be protected, and other combinations that obviously include these features. These variations and/or combinations all fall within the technical field covered by the utility model and fall within the scope of protection of the utility model claims.

The invention claimed is:

1. A household submersible pump, characterized in that it comprises:
   a pump base having a water outlet located at a rear side thereof and a water inlet located at a bottom thereof, within which a first filter screen is provided directly opposite to the water inlet;
   a pump body having an inner housing provided with an inner electrical cavity in which a circuit board is accommodated and a front mount, and an outer housing provided with a front guiding seat which is positioned corresponding to the front mount;
   a signal light assembly comprising a signal light and a light guiding column with a watertight seal embedded therein, wherein the signal light is connected to the circuit board, the light guiding column is configured to be rotatable from a first state in which it is able to be inserted into the front mount through the front guiding seat to a second state in which it is locked in the front mount and able to transmit light emitted from the signal light outside of the outer housing.

2. The household submersible pump as claimed in claim 1, characterized in that the light guiding column is locked in the front mount in the second state by means of a self-locking mechanism which comprises a first locking member formed on the light guiding column and used as a locking male or a locking female and a second locking member formed on the front mount and used as a locking female or a locking male.

3. The household submersible pump as claimed in claim 2, characterized in that the front mount has a mounting slot with an upper side opening and a locking wing located above the mounting slot, wherein the first locking member is a locking block formed on the light guiding column, and
   the second locking member is a side opening locking notch formed on the locking wing and adapted for the locking block, and wherein in the first state, the locking block is located outside of the side opening locking notch and the light guiding column is movable back and forth along the mounting slot, and
   in the second state, the locking block is held by the side opening locking notch so that the light guiding column is locked in the front mount.

4. The household submersible pump as claimed in claim 3, characterized in that the mounting slot has an inner port to which the signal light is arranged directly opposite.

5. The household submersible pump as claimed in claim 4, characterized in that the mounting slot is a step-shaped slot comprising a small-diameter hole, a medium-diameter hole and a large-diameter hole, and
   the light guiding column comprises a small-diameter section, a medium-diameter section and a large-diameter section correspondingly, wherein the small-diameter section is sized in correspondence with the small-diameter hole and the inner port, the medium-diameter section is sized in correspondence with the medium-diameter hole and provided with a circumferential recess for receiving a waterproof seal ring, and the large-diameter section is sized in correspondence with the large-diameter hole and adapted for being accommodated in the front guiding seat.

6. The household submersible pump as claimed in claim 5, characterized in that the pump body further comprises a front panel attached to the outer front side of the outer housing, wherein the front panel is configured to have an eye opening positioned opposite to the front guiding seat, and the light guiding column has a front grip which comprises an outer eye portion being received in the eye opening and an inner stop portion having a larger size than the outer eye portion and being located between the front panel and the front guiding seat.

7. The household submersible pump as claimed in claim 6, characterized in that the front guiding seat has a guiding channel for receiving the light guiding column, and the eye opening is arranged directly opposite to the guiding channel.

8. The household submersible pump as claimed in claim 7, characterized in that the water inlet is further provided with a second filter screen which is detachably mounted to the bottom of the water inlet at the outside of the first filter screen, wherein both the first filter screen and the second filter screen have filter holes thereon, and an aperture diameter of the filter holes of the second filter screen is smaller than that of the first filter screen.

9. The household submersible pump as claimed in claim 7, characterized in that the water outlet is connected with a quick coupling device for pluggable installation and removal of a water pipe, wherein the quick coupling device comprises a locking ring, a resetting spring, a movable ring that are sequentially sleeved on the water outlet, and a joint with a sealing ring therein.

10. The household submersible pump as claimed in claim 7, characterized in that it further comprises a water level detection device that is arranged on the bottom of the pump base and electrically connected to the circuit board, wherein the water level detection device comprises a first probe and a second probe which are located on one side of the water outlet, and a third probe which is located on the other side of the water outlet, and wherein the length of the second probe is smaller than the first probe, and the first probe and the third probe are the same length.

11. The household submersible pump as claimed in claim 1, characterized in that the water inlet is further provided with a second filter screen which is detachably mounted to the bottom of the water inlet at the outside of the first filter screen, wherein both the first filter screen and the second filter screen have filter holes thereon, and an aperture diameter of the filter holes of the second filter screen is smaller than that of the first filter screen.

12. The household submersible pump as claimed in claim 11, characterized in that the pump base is provided with an engaging recess at the bottom thereof, and the second filter screen is provided with an engaging protrusion at its circumferential edge to adapt for the engaging recess.

13. The household submersible pump as claimed in claim 12, characterized in that the second filter screen is further provided with a toggle rib to facilitate the detachment and installation of the second filter screen.

14. The household submersible pump as claimed in claim 1, characterized in that the water outlet is connected with a quick coupling device for pluggable installation and removal of a water pipe, wherein the quick coupling device comprises a locking ring, a resetting spring, a movable ring that are sequentially sleeved on the water outlet, and a joint with a sealing ring therein.

15. The household submersible pump as claimed in claim 14, characterized in that the locking ring is provided with a latch, the joint is provided with an annular guiding groove for matching the latch on the locking ring, and the water outlet of the pump base is provided with an opening on its outer pipe wall for the latch to pass radially through and thereby enter the annular guiding groove.

16. The household submersible pump as claimed in claim 15, characterized in that the water outlet of the pump base is provided with an annular stop on the outer wall thereof for limiting the axial travel of the resetting spring, and the movable ring is provided with a flexible clasp at the inner surface thereof, the resetting spring is thereby positioned between the annular stop and the flexible clasp so that when the movable ring is moved axially along the outer wall of the water outlet, the resetting spring is movable between a locked position and an unlocked position with an distance adjustment between the annular stop and the flexible clasp, wherein in the locked position, the resetting spring is in an extended reset state in which the latch on the locking ring engages the annular guiding groove on the joint, and in the unlocked position, the resetting spring is in a compression state in which the latch on the locking ring is disengaged from the annular guiding groove on the joint under the action of an external force and the joint is able to be pulled out from the water outlet.

17. The household submersible pump as claimed in claim 16, characterized in that the joint is an elbow joint or a straight joint.

18. The household submersible pump as claimed in claim 1, characterized in that it further comprises a water level detection device that is arranged on the bottom of the pump base and electrically connected to the circuit board, wherein the water level detection device comprises a first probe and a second probe which are located on one side of the water outlet, and a third probe which is located on the other side of the water outlet, and wherein the length of the second probe is smaller than the first probe, and the first probe and the third probe are the same length.

19. The household submersible pump as claimed in claim 18, characterized in that the water level detection device further comprises a plastic bracket which is provided at its two ends a main probe mount for mounting the first probe and the second probe thereon and a secondary probe mount for mounting the third probe thereon.

20. The household submersible pump as claimed in claim 19, characterized in that the water level detection device further comprises a signal line which is electrically connected to the circuit board at one end thereof, and to the first probe, the second probe and the third probe respectively at the other end thereof.

* * * * *